Oct. 14, 1969 E. M. KERWIN, JR 3,472,515

PHONOGRAPH RECORD APPARATUS

Filed Feb. 7, 1967

EDWARD M. KERWIN JR., INVENTOR

BY Rines and Rines 3,472,515
Patented Oct. 14, 1969

3,472,515

PHONOGRAPH RECORD APPARATUS

Edward M. Kerwin, Jr., Weston, Mass., assignor to Bolt Beranek and Newman Inc., Cambridge, Mass., a corporation of Massachusetts Filed Feb. 7, 1967, Ser. No. 614,452
Int. Cl. G11b *25/06*
U.S. Cl. 274—11 8 Claims

ABSTRACT OF THE DISCLOSURE

Phonograph record apparatus employing a novel annular record strip containing successive spirally arranged recording tracks on a surface thereof such that successive tracks are adapted to comprise separate recorded messages, the messages being capable of reproduction when the strip is advanced between conical transport rollers, either as an endless loop or, after transverse cutting, as a record of finite length.

Figures 1, 2, 3:
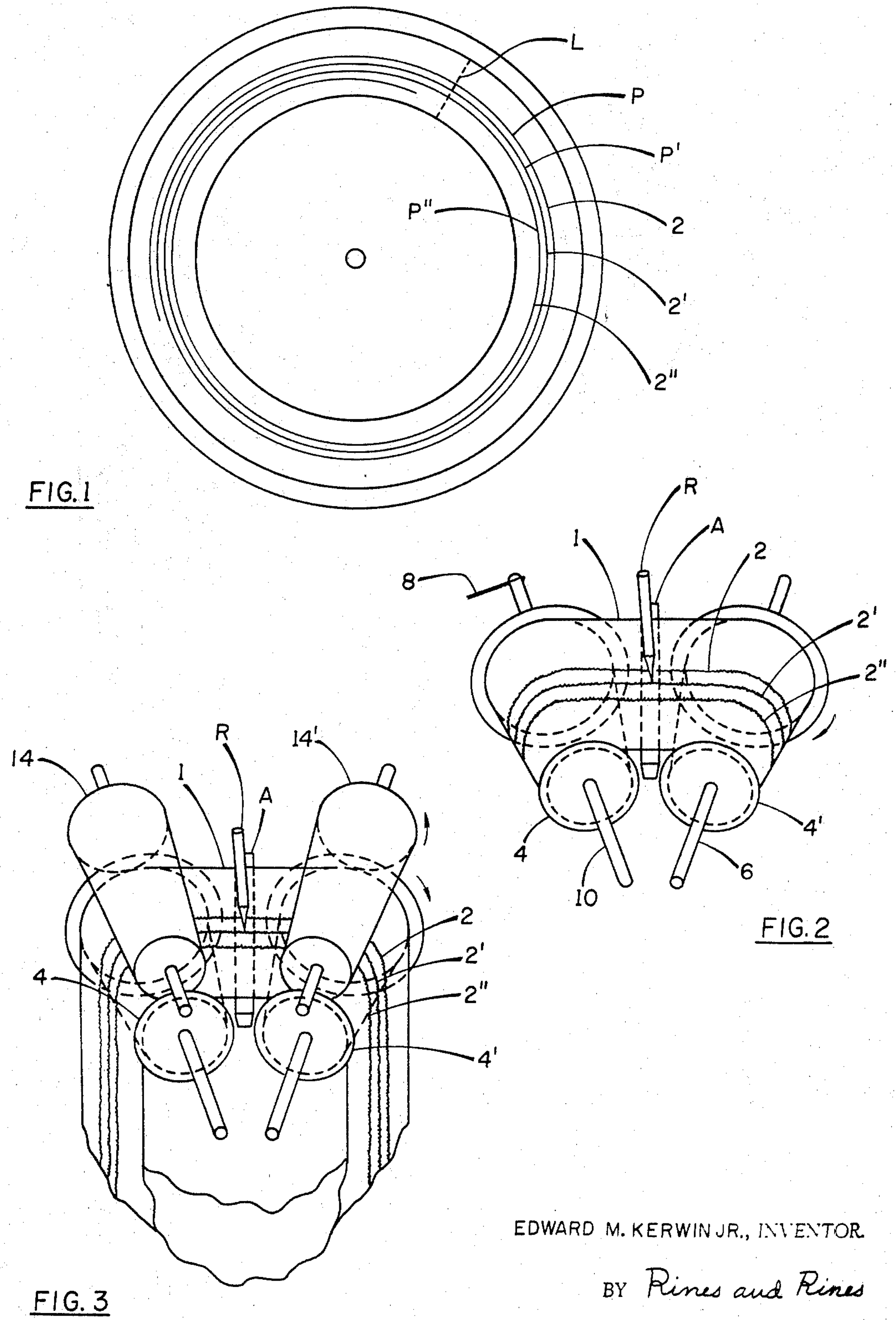

The invention is directed to phonograph record apparatus and, more particularly, to apparatus that is well adapted for use in inexpensive sound-reproducing systems such as those employed in speaking dolls or other toys, though it is to be understood that the principles of the invention are equally applicable to other types of recording and reproducing systems as well.

For many applications of the above-described type, it is very convenient, from both the point of view of cost and mechanical construction, to employ a tape or strip phonograph record which can be passed between take-up and drive reels in substitution for flat disc records of the more conventional type. Unfortunately, however, the impressing of a plurality of recorded messages on such tape recording strips requires special types of recording and record-manufacturing techniques and apparatus that deviate considerably from the conventional type of recording and manufacturing apparatus used in fabrication of flat disc records with spiral recording grooves. It is to the problem of obtaining many of the advantages of a tape record consistent with retaining the decided advantages of the recording and manufacturing techniques used in the flat disc recording art that the present invention is, accordingly, primarily directed.

An object of the invention is to provide a new and improved phonograph record apparatus that embodies some of the best features of each of tape and flat disc records to provide a new and improved phonograph record and a new and improved apparatus for causing the record to be supported and played in small spaces.

A further object is to provide a new and improved sound-recorded reproducing apparatus, hereinafter generically referred to as phonograph record apparatus, of more general utility, as well.

Other and further objects will be explained hereinafter and will be more particularly pointed out in the appended claims.

In summary, however, the concepts underlying the invention involve a phonograph record apparatus comprising an annular strip provided with successive spirally arranged recording tracks on a surface thereof such that the successive tracks are adapted, if desired, to comprise separate recorded messages. Preferred constructional details are hereinafter set forth.

The invention will now be described with reference to the accompanying drawing:

FIG. 1 of which is a plan view of a record constructed in accordance with the invention;

FIG. 2 is a fragmentary isometric view showing the record mounted in a particular preferred manner; and FIG. 3 is a similar view of a further modification.

Referring to FIG. 1, the novel phonograph record of the present invention comprises an annular flexible strip 1, provided with successive spirally arranged recording grooves or tracks 2, 2', 2'', etc., on the outer surface thereof. It will be evident that these recordings may be made in the conventional fashion and with the conventional apparatus of disc records, and the record itself may be stamped into the annular strip shown at 1.

In certain application, as in the case of speaking toys and the like, where separate messages starting at different locations are desired to permit the user to adjust the record relative to the reproducing head or needle pick-up in different amounts in order to select different of the recorded messages, the commencements of the separate recorded messages of the successive tracks 2, 2', 2'', may be caused to occur in the vicinity of a predetermined transverse location L, but at successively displaced peripheral points, such as P, P', P'', etc.

There are several ways in which this record may be played in order to take advantage of some of the benefits of a tape or strip record as distinguished from a disc record. In FIG. 2, for example, the strip 1 has been slit or cut transversely along the predetermined radial line at the transverse location L and wound upon a first conical takeup reel or roller 4, and then passed on to a similar conical drive reel or roller 4', with the phonograph reproducing needle or other pick-up device playing upon the selected recorded tracks or grooves 2, 2', 2'' in the intermediate region schematically illustrated by the arrow R, as is well known. An anvil to give support to the record strip as the needle R plays thereupon is shown at A. It is apparent, of course, that the separate recorded messages in the successive tracks need not extend beyond the location L, so that the cutting of the strip does not interrupt the messages.

Since the drive mechanism and necessary clutch, variable speed control, tensioning and re-wind drawstring or the like are all well known in this art and constitute no part of the novelty of the present invention, they have not been illustrated in order not to detract from the novel features of the invention; but it is to be understood that the conical drive reel 4' will be connected along its axial axis 6 to, for example, a spring-energized drive mechanism of any conventional type with the strip 1 mounted under tension, as is further well known, between the take-up and drive reels 4 and 4'. Similarly, the re-wind drawstring or other mechanism, schematically illustrated at 8, will be associated with the axial mounting 10 of the take-up reel 4, in well-known fashion, to enable the user to re-wind by pulling backward against the action of, for example, the drive spring, and to the degree required to select any of the commencement points P, P', P'', etc., of the different recorded grooves. It will be observed, however, that it is essential to the attainment of the results of utilizing this annular strip 1 with the advantages of many of the features of a conventional tape, for the conical take-up and drive rollers 4 and 4' to be mounted with their axes converging, as shown, whereby the strip, which is a flat annulus in the unconstrained or relaxed state of FIG. 1, may pass smoothly about the conical surfaces of the rollers.

It is not always necessary, however, to slit the annular record strip 1; but it may, if desired, be driven in continuous tape fashion as in the manner shown, for example, in FIG. 3. The conical reels 4 and 4' are there shown engaging respective conical idler rollers 14 and 14' with the record 1 being engaged between the idlers 14 and 14' and the conical drive reels or rolls 4 and 4'. If desired, of course, the function of the reels or rolls 4 and 4' could be combined into a single conical drive cone cooperating with the conical idler cones 14 and 14', in which event the function of the anvil A would also be served by this single drive cone.

Further modifications will also occur to those skilled in the art and all such are considered to fall within the spirit and scope of the invention.

What is claimed is:

1. A phonograph record apparatus comprising arcuate flexible strip provided with recording tracks on a surface thereof, the strip when unconstrained and disposed flat being annular with the tracks arranged spirally, and a pair of conical roller means disposed with their axes converging, said strip extending between said roller means under tension and passing smoothly about the conical surfaces thereof, and the concave side of said strip facing towards the point of convergence.

2. A phonograph record apparatus as claimed in claim 1 and in which the successive tracks each comprise separate recorded messages.

3. A phonograph record apparatus as claimed in claim 2 and in which the commencement of the recording of the separate messages of the successive tracks is in the vicinity of a predetermined transverse location of the strip.

4. A phonograph record apparatus as claimed in claim 3 and in which the commencements of the recordings of the separate messages of the successive tracks are spaced in said vicinity at successively displaced peripheral points from the said predetermined transverse location.

5. A phonograph record apparatus as claimed in claim 3 and in which the said strip is transversely slit at said predetermined location.

6. A phonograph record apparatus as claimed in claim 1 and in which the said strip is transversely slit at a predetermined location.

7. A phonograph record apparatus as claimed in claim 1 and in which the conical roller means comprises conical take-up and drive reels, the strip being transversely slit at a region thereof near the commencement of the recording and being wound about the take-up reel and passing onto the drive reel.

8. A phonograph record apparatus as claimed in claim 1 and in which the conical roller means comprises a pair of conical idler rolls engaging the strip against conical drive-cone means.

References Cited

UNITED STATES PATENTS

| | | | |
|---|---|---|---|
| 3,332,690 | 7/1967 | Michetti | 274—42 |
| 3,321,208 | 5/1967 | Nicholson | 274—42 |
| 3,095,200 | 6/1963 | Cailliot | 274—43 |
| 2,753,706 | 7/1956 | Franklin | 226—184 |

LEONARD FORMAN, Primary Examiner

ROGER A. FIELDS, Assistant Examiner

U.S. Cl. X.R.

226—184